DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 7, 1972

896 O.G. 16

T896,006
ANTISTATIC POLYOLEFIN COMPOSITION

Alan B. Glanvill, "Broad Hinton" Beechfield Road, Alderley Edge, Cheshire, England

Filed Sept. 28, 1970, Ser. No. 76,322
Claims priority, application Great Britain, Sept. 30, 1969, 47,941/69
Int. Cl. C08f *29/02, 29/04, 37/00*
U.S. Cl. 260—93.7
No Drawing. 12 Pages Specification

Effectiveness of antistatic additives such as hydroxyalkyl substituted amines and long chain fatty acid amides in polyolefins is improved by incorporating therein a $C_{12}$–$C_{20}$ aliphatic alcohol.